United States Patent
Liu et al.

(10) Patent No.: US 11,431,888 B2
(45) Date of Patent: Aug. 30, 2022

(54) AUTO-FOCUS METHOD FOR A REMOTE SENSING SATELLITE AND THE SATELLITE THEREFOR

(71) Applicant: National Applied Research Laboratories, Taipei (TW)

(72) Inventors: Shiau-Jing Liu, Hsinchu (TW); Yu-Lin Tsai, Hsinchu (TW); Li-Fen Huang, Hsinchu (TW)

(73) Assignee: National Applied Research Laboratories, Taipei (TW)

(*) Notice: Subject to any disclaimer, the term of this patent is extended or adjusted under 35 U.S.C. 154(b) by 0 days.

(21) Appl. No.: 17/332,591

(22) Filed: May 27, 2021

(65) Prior Publication Data

US 2021/0377439 A1    Dec. 2, 2021

(30) Foreign Application Priority Data

Jun. 1, 2020   (TW) ................................. 109118345

(51) Int. Cl.
| | |
|---|---|
| *H04N 7/18* | (2006.01) |
| *H04N 5/232* | (2006.01) |
| *G06T 7/80* | (2017.01) |
| *G06T 7/00* | (2017.01) |

(52) U.S. Cl.
CPC ....... *H04N 5/23212* (2013.01); *G06T 7/0002* (2013.01); *G06T 7/80* (2017.01); *G06T 2207/10032* (2013.01); *G06T 2207/10148* (2013.01); *G06T 2207/30168* (2013.01)

(58) Field of Classification Search
CPC ...... H04N 7/18; H04N 5/232; H04N 5/23212; G06T 7/80; G06T 7/0002; G06T 2207/10032; G06T 2207/10148; G06T 2207/30168
USPC .................................................. 348/144, 254
See application file for complete search history.

(56) References Cited

U.S. PATENT DOCUMENTS

| | | | | |
|---|---|---|---|---|
| 6,151,415 A | * | 11/2000 | Acharya ................. | H04N 19/63 348/E5.045 |
| 7,711,201 B2 | * | 5/2010 | Wong ..................... | G03B 13/30 382/254 |
| 8,203,602 B2 | * | 6/2012 | Ren ......................... | G06T 5/003 348/78 |

(Continued)

*Primary Examiner* — Trang U Tran
(74) *Attorney, Agent, or Firm* — Birch, Stewart, Kolasch & Birch, LLP

(57) ABSTRACT

Auto-focus method and a remote sensing satellite are disclosed. The satellite comprises at least a focal plane assembly (FPA) and a focus adjusting apparatus, the auto-focus method comprises: processing a point spread function (PSF) estimation to a multiple regions of a first image to generate multiple first estimated point spread functions; generating a first average point spread function according to the first estimated point spread functions; processing a Gaussian curve fitting to the first average PSF function and defining a first focus number; processing a PSF estimation to multiple regions of a second image to generate multiple second estimated PSF functions; generating a second average point spread function according to the second estimated point spread functions; processing a Gaussian curve fitting to the second average point spread function and defining a second focus number; and comparing the first focus number and the second focus number.

3 Claims, 4 Drawing Sheets

(56) References Cited

U.S. PATENT DOCUMENTS

| | | | | |
|---|---|---|---|---|
| 8,294,811 B2* | 10/2012 | Kulkarni | ................ | G03B 13/36 |
| | | | | 382/254 |
| 9,224,193 B2* | 12/2015 | Tsujimoto | ................ | G06T 5/003 |
| 10,951,835 B1* | 3/2021 | Kashiwagi | ......... | H04N 5/23225 |

* cited by examiner

AUTO-FOCUS METHOD FOR A REMOTE SENSING SATELLITE AND THE SATELLITE THEREFOR

BACKGROUND OF THE INVENTION

1. Field of the Invention

The present invention relates to an auto-focus method and more particularly to an auto-focus method for a remote sensing satellite and the satellite therefor.

2. Description of Related Art

When a remote sensing satellite reaches a mission orbit and starts to move round, the remote sensing satellite will start to execute some missions such as photographing the ground and collecting images. With reference to FIG. 1, which is a schematic diagram of the conventional system. The remote sensing satellite 10 provides with a Focal Plane Assembly (FPA) 102 for collecting images and transmitting the images to the ground 12 for performing an image processing. However, the images collected by the FPA 102 on the orbit are required to be compensate because the setting maybe different from the ground 12. Otherwise, the remote sensing satellite can not finish the mission because of lack of clarity. In the conventional art, the ground staff will try to regulate the focus adjusting apparatus 104 of the remote sensing satellite 10 remotely according to the received image to regulate the focus of the FPA 102.

However, when the remote sensing satellite 10 collects the images, usually, time and location are limited such that regulating the focus of the FPA 102 is time-consuming and laborious. For example, to determine current focus status, a specific pattern on the ground should be captured for determining the focus status of FPA 102. Accordingly, the image data of the specific pattern is used for determining the focus status. The remote sensing satellite 10 should transmit the image including the specific pattern to the ground 12, and the ground staff will try to send a focusing command to the focus adjusting apparatus 104 to regulate the focus status of the FPA 102. The next captured image data is to ensure that the focus status is improved (regulating to a right direction) in order to decide a next regulation. However, because the earth and the remote sensing satellite 10 operate on their own orbits individually, a same location only can be reached in one period for example, 24 hours period. Accordingly, after 24 hours of focus regulation last time, an image including the specific pattern can be captured again and sending to the ground to determine if the focus regulation last time is right, and repeating the process such that the focus regulation process is very time consuming.

SUMMARY OF THE INVENTION

One purpose of the present invention is to provide an auto-focus method, which does not require to capture a specific image and can be finish on satellite.

One purpose of the present invention is to provide an auto-focus method for a remote sensing satellite and the satellite therefor.

According to the present invention, an auto-focus method for a remote sensing satellite, wherein the remote sensing satellite includes at least one focal plane assembly and a focus adjusting apparatus, and the method comprises steps of: processing a point spread function (PSF) estimation to multiple regions of a first image to generate a plurality of first estimated point spread functions; generating a first average point spread function according to the first estimated point spread functions; processing a Gaussian curve fitting to the first average point spread function and defining a first focus number of the first image; controlling the focus adjusting apparatus to regulate the focus of the focal plane assembly to obtain a second image; processing the PSF estimation to multiple regions of the second image to generate a plurality of second estimated point spread functions; generating a second average point spread function according to the second estimated point spread functions; processing a Gaussian curve fitting to the second average point spread function and defining a second focus number of the second image; and comparing the first focus number and the second number to determining if the focus status of the second image being better than the first image in order to determine if continuing to regulate the focus of the focal plane assembly.

According to the present invention, an auto-focus method comprising steps of: processing a point spread function (PSF) estimation to multiple regions of a first image to generate a plurality of first estimated point spread functions; generating a first average point spread function according to the first estimated point spread functions; processing a Gaussian curve fitting to the first average point spread function and defining a first focus number of the first image; processing the PSF estimation to multiple regions of a second image to generate a plurality of second estimated point spread functions; generating a second average point spread function according to the second estimated point spread functions; processing a Gaussian curve fitting to the second average point spread function and defining a second focus number of the second image; and comparing the first focus number and the second number to determining if the focus status of the second image being better than the first image.

According to the present invention, a remote sensing satellite, comprising: a focal plane assembly for collecting a first image and a second image; an image processing block coupled to the focal plane assembly, and executing steps of: processing a point spread function (PSF) estimation to multiple regions of the first image to generate a plurality of first estimated point spread functions; generating a first average point spread function according to the first estimated point spread functions; processing a Gaussian curve fitting to the first average point spread function and defining a first focus number of the first image; processing the PSF estimation to multiple regions of the second image to generate a plurality of second estimated point spread functions; generating a second average point spread function according to the second estimated point spread functions; processing a Gaussian curve fitting to the second average point spread function and defining a second focus number of the second image; and comparing the first focus number and the second number to generate a focus regulation status result; a focus adjusting apparatus coupled to the focal plane assembly and the image processing block to regulate the focus of the focal plane assembly according to the focus regulation status result; wherein, the focus adjusting apparatus regulates the focus of the focal plane assembly such that the focus of the first image and the focus of the second image are different.

DETAILED DESCRIPTION OF THE PREFERRED EMBODIMENT

Figure 1:
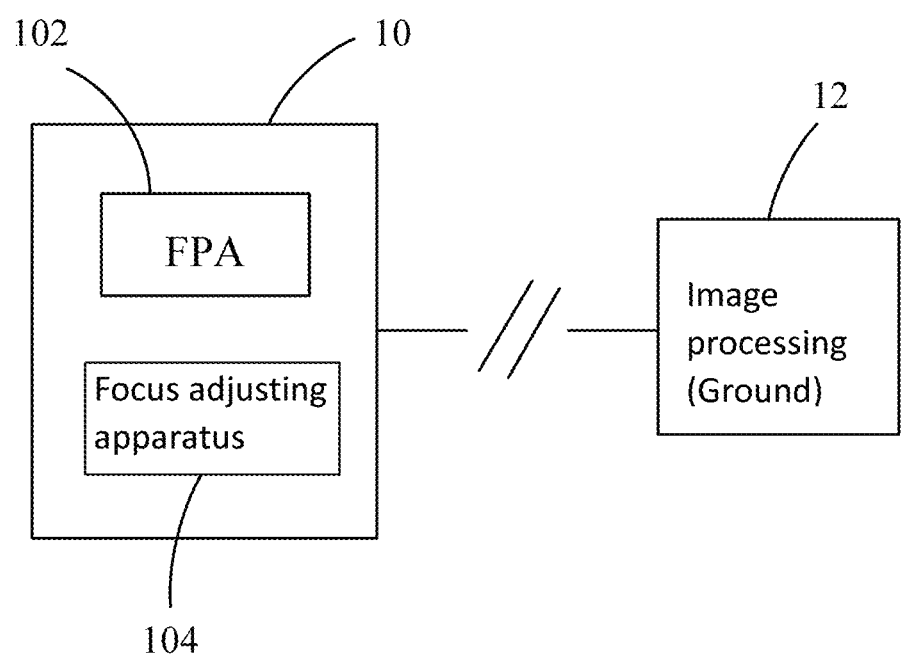
FIG. 1 is a schematic diagram of the focus regulation and verification of the remote sensing satellite according to the conventional art.
Figure 2:
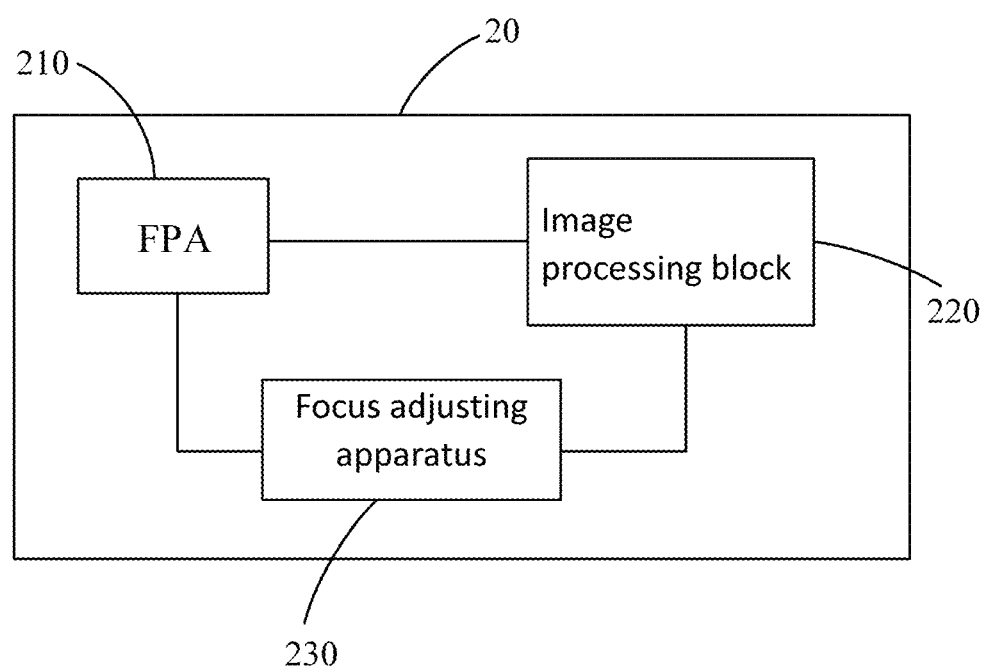
FIG. 2 is a schematic diagram of the system architecture according to an embodiment of the present invention.

With reference to FIG. 2, FIG. 2 is a schematic diagram of the system architecture according to an embodiment of the present invention. A remote sensing satellite 20 provides with a FPA 210, a focus adjusting apparatus 230 and an image processing block on satellite 220. The focus adjusting apparatus 230 is used for regulating the focus of the FPA 210. Because the focus of the FPA 210 is usually fixed. The focus adjusting apparatus 230 is different from a normal focus adjusting apparatus. In one embodiment, the focus adjusting apparatus 230 regulates the focus of FPA 210 by heating or cooling. The image processing block 220 can be a calculation circuit formed by a hardware, or realized by a software method. The image collected by the FPA 210 is transmitted to the image processing block 220 to perform the focus regulation and check the focus status.

Figure 3:
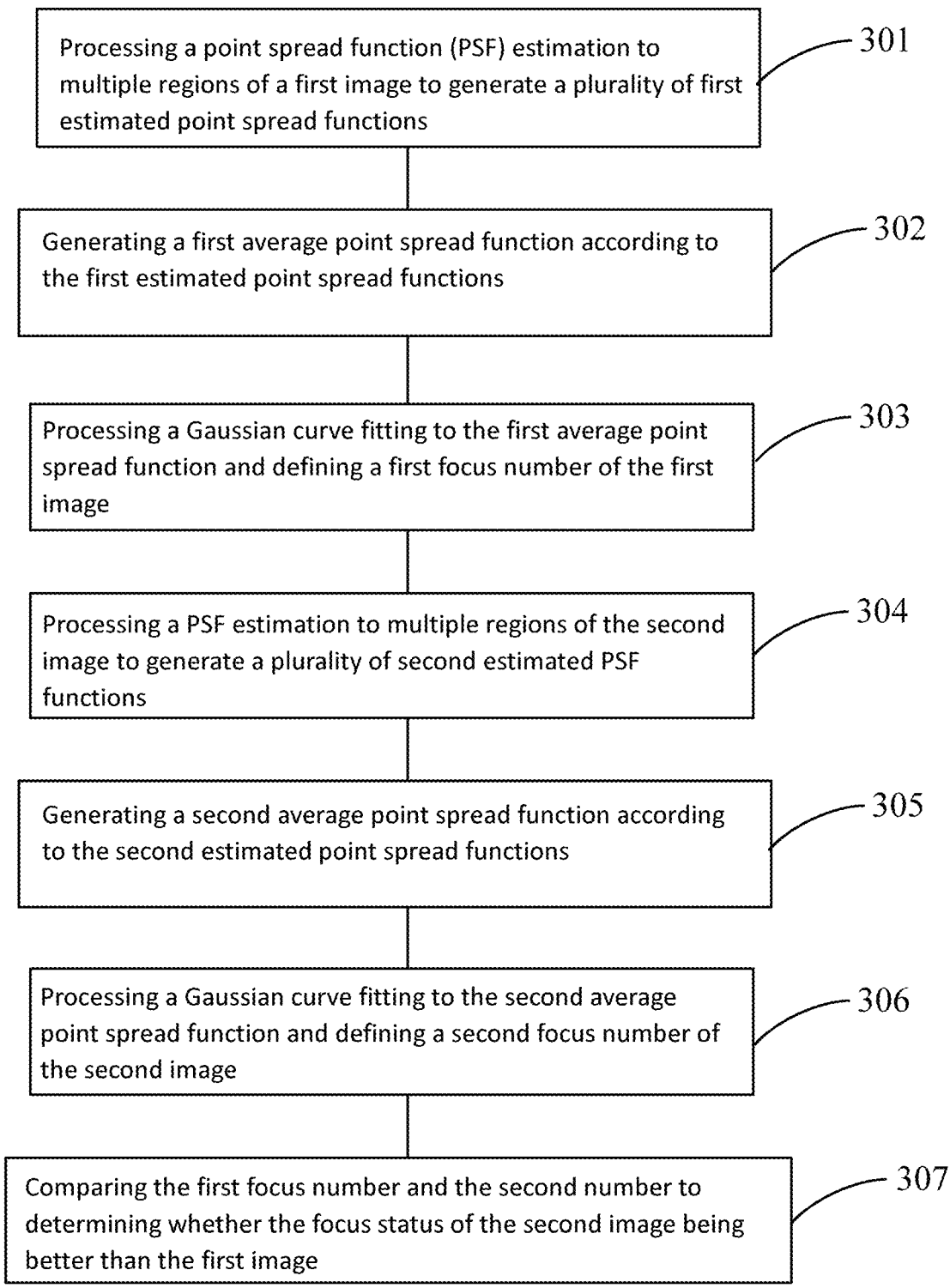
FIG. 3 is a flowchart of the auto-focus and verification according to the present invention.

FIG. 3 is a flowchart of the auto-focus method according to the present invention. The method comprises the following steps. The step S301: processing a point spread function (PSF) estimation to multiple regions of a first image to generate a plurality of first estimated point spread functions. The step S302: generating a first average point spread function according to the first estimated point spread functions. The step S303: processing a Gaussian curve fitting to the first average point spread function and defining a first focus number of the first image. The step S304: processing a PSF estimation to multiple regions of the second image to generate a plurality of second estimated PSF functions. The step S305: generating a second average point spread function according to the second estimated point spread functions. The step S306: processing a Gaussian curve fitting to the second average point spread function and defining a second focus number of the second image. The step S307: comparing the first focus number and the second number to determining whether the focus status of the second image being better than the first image.

Figure 4:
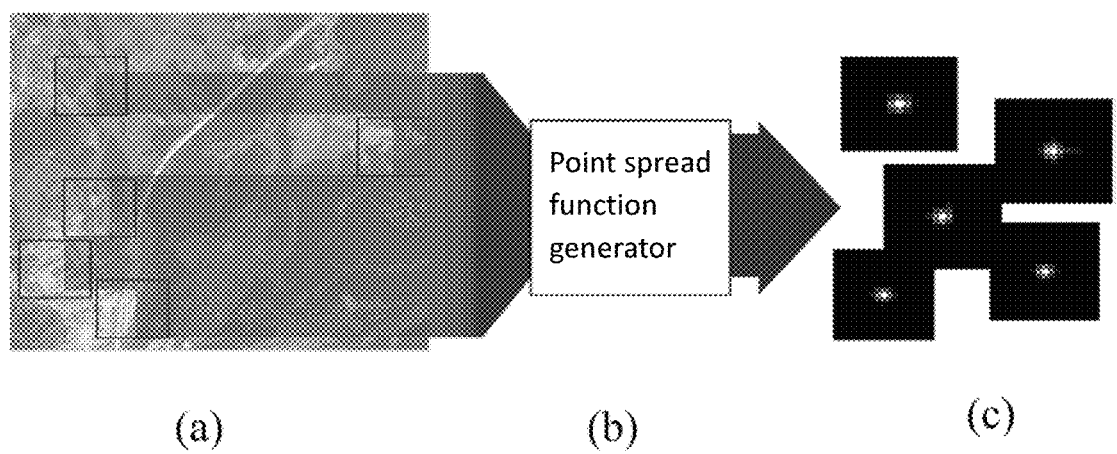
FIG. 4 is a flowchart of generating estimated point spread function according to the present invention.

The following content will combine the hardware architecture in FIG. 2 and the schematic diagram in FIG. 4 to illustrate the flowchart of FIG. 3. An optical system can be regarded as a shift-invariant system. The information of each point on a plane will be acted by a same point spread function when inputting to the optical system, and the point spread function will not change with the location of the inputted point of the plane, which is called the shift-invariant property. Firstly, the image processing block 220 selects some areas including enough edge information in the images collected by FPA 210 such as shown FIG. 4 (a) in order to process a point spread function (PSF) estimation. Then, through PSF generator as shown in FIG. 4(b) such as the Levin generator or the Fergus generator to show a plurality of estimated point spread functions from different areas, that is, the PSF set. The PSF set can be defined as:

$$K = \{PSF_i | \text{the PSF is estimated from different region}\}$$

In the process of generating the PSF, the random noise is generated. In order to eliminate the random noise, using an average point spread function of the estimated PSF set. The formula is as follow:

$$\overline{PSF} = \frac{1}{n}\sum_{i=1}^{n} PSF_i \text{ where } PSF_i \in K$$

Then, processing a Gaussian curve fitting to the average PSF in order to obtain a standard deviation on x-axis and a standard deviation on y-axis of a Gaussian function in order to define a focus number:

$$F = \max(\sigma_x, \sigma_y)$$

Then, a best focus location will have a minimum focus number, that is, searching for the minimum focus number:

$$\min F$$

After performing the above calculation, the smaller value means the focus status is better. The system can determine that if the value is decreased gradually, that is, the step S307: comparing the first focus number and the second number of two images to determining whether the focus status of the second image being better than the first image in order to determine that if the current focus regulation direction is right in order to decide that if instructing the focus adjusting apparatus 230 to regulate the focus of the FPA 210 in the same way. For example, obtaining a first image, and setting the focus adjusting apparatus 230 to change the focus of the FPA 210 in a first way to obtain a second image, through the above calculation, if the first focus number is greater the second focus number, which means the first way is correct. Continuing the first way to regulate the focus of the FPA 210 to make the second focus number reach a preset value. The focus regulation is complete and the auto-focus process is end. If in the above process, the second focus number is greater than the first focus number, determining that the current focus method cause an opposite effect, an opposite way to perform the focus regulation is required. Besides, the auto-focus method provided by the present invention only requires to obtain an image having sufficient edge information to determine if the focus number is gradually decreased, two images including the specific object is not required. In other words, the remote sensing satellite 20 does not require to reach the specific location to obtain a specific image.

The present invention provides an auto-focus mechanism after focus regulation on satellite, obtaining specific image is not required, and additional lighting devices are not required so as to reduce the complexity of the focus adjusting apparatus and reduce the verification time of the focus regulation result.

The above embodiments of the present invention are not used to limit the claims of this invention. Any use of the content in the specification or in the drawings of the present invention which produces equivalent structures or equivalent processes, or directly or indirectly used in other related technical fields is still covered by the claims in the present invention.

What is claimed is:

1. An auto-focus method for a remote sensing satellite, wherein the remote sensing satellite includes at least one focal plane assembly and a focus adjusting apparatus, and the method comprises steps of:

processing a point spread function (PSF) estimation to multiple regions of a first image to generate a plurality of first estimated point spread functions;

generating a first average point spread function according to the first estimated point spread functions;

processing a Gaussian curve fitting to the first average point spread function and defining a first focus number of the first image;

controlling the focus adjusting apparatus to regulate the focus of the focal plane assembly to obtain a second image;

processing the PSF estimation to multiple regions of the second image to generate a plurality of second estimated point spread functions;

generating a second average point spread function according to the second estimated point spread functions;

processing a Gaussian curve fitting to the second average point spread function and defining a second focus number of the second image; and comparing the first focus number and the second number to determining if the focus status of the second image being better than the first image in order to determine if continuing to regulate the focus of the focal plane assembly.

2. An auto-focus method comprising steps of:

processing a point spread function (PSF) estimation to multiple regions of a first image to generate a plurality of first estimated point spread functions;

generating a first average point spread function according to the first estimated point spread functions;

processing a Gaussian curve fitting to the first average point spread function and defining a first focus number of the first image;

processing the PSF estimation to multiple regions of a second image to generate a plurality of second estimated point spread functions;

generating a second average point spread function according to the second estimated point spread functions;

processing a Gaussian curve fitting to the second average point spread function and defining a second focus number of the second image; and comparing the first focus number and the second number to determining if the focus status of the second image being better than the first image.

3. A remote sensing satellite, comprising:

a focal plane assembly for collecting a first image and a second image;

an image processing block coupled to the focal plane assembly, and executing steps of:

processing a point spread function (PSF) estimation to multiple regions of the first image to generate a plurality of first estimated point spread functions;

generating a first average point spread function according to the first estimated point spread functions;

processing a Gaussian curve fitting to the first average point spread function and defining a first focus number of the first image;

processing the PSF estimation to multiple regions of the second image to generate a plurality of second estimated point spread functions;

generating a second average point spread function according to the second estimated point spread functions;

processing a Gaussian curve fitting to the second average point spread function and defining a second focus number of the second image; and comparing the first focus number and the second number to generate a focus regulation status result;

a focus adjusting apparatus coupled to the focal plane assembly and the image processing block to regulate the focus of the focal plane assembly according to the focus regulation status result;

wherein, the focus adjusting apparatus regulates the focus of the focal plane assembly such that the focus of the first image and the focus of the second image are different.

* * * * *